US012769333B2

(12) United States Patent
Lee et al.

(10) Patent No.: US 12,769,333 B2
(45) Date of Patent: Oct. 20, 2026

(54) PURPOSE-BUILT VEHICLE AND OPERATION METHOD THEREOF

(71) Applicant: Seoul Dynamics, Gyeonggi-do (KR)

(72) Inventors: Geosong Lee, Gyeonggi-do (KR); Yongseung Lee, Gyeonggi-do (KR)

(73) Assignee: Seoul Dynamics, Gyeonggi-do (KR)

( * ) Notice: Subject to any disclaimer, the term of this patent is extended or adjusted under 35 U.S.C. 154(b) by 54 days.

(21) Appl. No.: 19/007,129

(22) Filed: Dec. 31, 2024

(65) Prior Publication Data

US 2025/0306606 A1 Oct. 2, 2025

(30) Foreign Application Priority Data

Mar. 29, 2024 (KR) ........................ 10-2024-0043155

(51) Int. Cl.

*G05D 1/656* (2024.01)
*B60P 1/64* (2006.01)
*G05D 1/69* (2024.01)
*G05D 101/15* (2024.01)

(52) U.S. Cl.

CPC ............ *G05D 1/656* (2024.01); *B60P 1/6418* (2013.01); *G05D 1/69* (2024.01); *G05D 2101/15* (2024.01)

(58) Field of Classification Search

CPC ...... G05D 1/656; G05D 1/69; G05D 2101/15; G05D 1/225; G05D 2105/28; G05D 1/696; G05D 2109/10; B60P 1/6418; B60W 60/0025; B60W 30/182; B60W 40/02; B60W 40/13; B60W 2420/403; B60W 2420/408; B60W 2530/203; B60W 2556/45; B62D 63/025; B62D 63/04

See application file for complete search history.

(56) References Cited

U.S. PATENT DOCUMENTS

2020/0122834 A1* 4/2020 Daw Perez ............ B64D 9/003
2021/0354287 A1 11/2021 Skaaksrud et al.
2023/0028672 A1* 1/2023 Oren ..................... B60P 1/6409

FOREIGN PATENT DOCUMENTS

JP 2011-059859 A 3/2011

OTHER PUBLICATIONS

English translation of Murakami et al. (JP 2011059859) (Year: 2011).*

English Translation of Written Opinion dated Aug. 30, 2024, issued in Korean Patent Application No. 10-2024-0043155.

* cited by examiner

*Primary Examiner* — Kyle J Kingsland

(74) *Attorney, Agent, or Firm* — SOLID STATE LAW FIRM PLLC

(57) ABSTRACT

A purpose-built vehicle (PBV) includes: a work module identification unit to identify that at least one work module is loaded onto or coupled to the purpose-built vehicle, a communication unit to communicate data, and at least one processor connected to the work module identification unit and the communication unit. The at least one processor identifies that a work module is loaded onto or coupled to the purpose-built vehicle, identifies the connection type of the work module via the work module identification unit, and, based on the connection type of the work module and an autonomous driving model corresponding to the driving mode of the purpose-built vehicle, controls the purpose-built vehicle.

18 Claims, 8 Drawing Sheets

PURPOSE-BUILT VEHICLE AND OPERATION METHOD THEREOF

CROSS-REFERENCE TO RELATED APPLICATIONS

The present application claims under 35 U.S.C. § 119(a) the benefit of Korean Patent Application Number 10-2024-0043155 filed Mar. 29, 2024, the entire contents of which application is incorporated herein for all purposes by this reference.

TECHNICAL FIELD

The embodiments disclosed in this disclosure relate to a purpose-built vehicle and a method for operating the same. More specifically, the present disclosure relates to a purpose-built vehicle and a method for operating the purpose-built vehicle, wherein an autonomous driving model can be adaptively selected based on the driving state.

BACKGROUND

A purpose-built vehicle (PBV) is a mobility vehicle that is designed or manufactured for a special purpose and may refer to a means of transportation that moves based on autonomous driving and remote driving. A purpose-built vehicle can be optimized to perform specialized tasks or functions depending on its purpose and can be utilized in various fields such as logistics, construction, and ports, as well as for transportation. The purpose-built vehicle must adapt to various environments and situations; to accomplish this, the vehicle can collect and analyze various data to perform learning.

SUMMARY

A purpose-built vehicle can be operated while connected to various work modules (e.g., trailers, containers, robot arms, etc.). Depending on the work modules that are connected, different driving methods and driving modes may be applied.

Based on the discussion above, the present disclosure provides an apparatus and method that enable a purpose-built vehicle to adaptively operate according to the type of work module connected to the purpose-built vehicle and the driving mode of the purpose-built vehicle.

According to one embodiment of the present disclosure, a purpose-built vehicle (PBV) includes: a work module identification unit to identify that at least one work module is loaded onto or coupled to the purpose-built vehicle, a communication unit for data communication, and at least one processor connected to the work module identification unit and the communication unit. The at least one processor identifies that a work module has been loaded onto or coupled to the purpose-built vehicle; identifies, via the work module identification unit, the connection type of the work module; and, based on the connection type of the work module and the driving mode of the purpose-built vehicle, controls the purpose-built vehicle. The connection type of the work module may include one of a first connection type, indicating a type connected via a coupling unit of the purpose-built vehicle, or a second connection type, indicating a type loaded via a loading unit of the purpose-built vehicle, and the driving mode of the purpose-built vehicle may include a first driving mode indicating individual driving and a second driving mode indicating collaborative driving.

In some embodiments, the work module identification unit includes a first identification unit that is connected to the coupling unit of the purpose-built vehicle and a second identification unit that is connected to the loading unit of the purpose-built vehicle. The at least one processor, if a first connection signal is identified via the first identification unit, determines that the connection type of the work module is the first connection type; and, if a second connection signal is identified via the second identification unit, determines that the connection type of the work module is the second connection type.

In some embodiments, the coupling unit includes a coupler, the loading unit includes a receiving groove and a weight sensor, the first connection signal includes an electrical signal generated when the coupler and the coupling pin of the work module are connected, and the second connection signal includes an electrical signal generated when the work module is engaged in the receiving groove or, if the work module is coupled to the loading unit, an electrical signal identified via the weight sensor.

In some embodiments, the at least one processor is configured to receive data concerning an autonomous driving model corresponding to the driving mode of the purpose-built vehicle via the communication unit.

In some embodiments, the autonomous driving model may include: a first autonomous driving model learned to support autonomous driving in the state where the work module is coupled to the purpose-built vehicle via the coupling unit; a second autonomous driving model learned to support autonomous driving in the state where the work module is loaded onto the purpose-built vehicle via the loading unit and the vehicle is in the first driving mode; and a third autonomous driving model learned to support autonomous driving in the state where the work module is loaded onto the purpose-built vehicle via the loading unit and the vehicle is in the second driving mode.

In some embodiments, the at least one processor receives, from a server device via the communication unit, information about the driving mode of the purpose-built vehicle, and determines the driving mode of the purpose-built vehicle based on the received information about the driving mode.

In some embodiments, the at least one processor identifies that at least one of the connection type or the driving mode of the purpose-built vehicle has changed, and receives, from the server device, information about one of the first autonomous driving model, the second autonomous driving model, or the third autonomous driving model.

In some embodiments, the at least one processor, upon identifying that at least one of the connection type or the driving mode of the purpose-built vehicle has changed, requests information concerning the changed autonomous driving model from the server device.

In some embodiments, the at least one processor, if a collaborative driving request is received from another purpose-built vehicle via the communication unit, is configured to determine that the driving mode of the purpose-built vehicle has changed.

In some embodiments, the at least one processor, upon identifying via the first identification unit or the second identification unit that the work module has changed, is configured to determine that the connection type of the purpose-built vehicle has changed.

According to one embodiment of the present disclosure, a method of operating a purpose-built vehicle (PBV)

includes: identifying that a work module is loaded onto or coupled to the purpose-built vehicle; identifying the connection type of the work module; and controlling the purpose-built vehicle based on the connection type of the work module and an autonomous driving model corresponding to the driving mode of the purpose-built vehicle. The connection type of the work module includes one of a first connection type, indicating a type connected through the coupling unit of the purpose-built vehicle, or a second connection type, indicating a type loaded via the loading unit of the purpose-built vehicle; and the driving mode of the purpose-built vehicle may include a first driving mode indicating individual driving and a second driving mode indicating collaborative driving.

In some embodiments, if a first connection signal is identified via the first identification unit connected to the coupling unit of the purpose-built vehicle, the connection type of the work module is determined to be the first connection type; and if a second connection signal is identified via the second identification unit connected to the loading unit of the purpose-built vehicle, the connection type of the work module is determined to be the second connection type.

In some embodiments, the first connection signal includes an electrical signal generated when the coupler of the purpose-built vehicle and the coupling pin of the work module are connected, and the second connection signal includes an electrical signal generated when the work module is engaged in the receiving groove of the purpose-built vehicle or, if the work module is coupled to the loading unit, an electrical signal identified via the weight sensor.

In some embodiments, the method of operating the purpose-built vehicle includes receiving data relating to an autonomous driving model corresponding to the driving mode of the purpose-built vehicle.

In some embodiments, the autonomous driving model includes: a first autonomous driving model learned to support autonomous driving with the work module coupled to the purpose-built vehicle via the coupling unit; a second autonomous driving model learned to support autonomous driving when the work module is loaded onto the purpose-built vehicle via the loading unit and the vehicle is in the first driving mode; and a third autonomous driving model learned to support autonomous driving when the work module is loaded onto the purpose-built vehicle via the loading unit and the vehicle is in the second driving mode.

In some embodiments, a purpose-built vehicle (PBV) device may comprise a work module identification unit configured to identify that at least one work module is loaded onto or coupled to the purpose-built vehicle, a communication unit configured for data communication, and at least one processor connected to the work module identification unit and the communication unit. The at least one processor may identify that a work module is loaded onto or coupled to the purpose-built vehicle, identify, via the work module identification unit, the connection type of the work module, and, based on the connection type of the work module and the driving mode of the purpose-built vehicle, control the purpose-built vehicle. The connection type of the work module may include one of a first connection type, indicating a type connected via a coupling unit of the purpose-built vehicle, or a second connection type, indicating a type loaded via the loading unit of the purpose-built vehicle. The driving mode of the purpose-built vehicle may include a first driving mode indicating individual driving and a second driving mode indicating collaborative driving. The at least one processor, upon identifying that at least one of the connection type or the driving mode of the purpose-built vehicle has changed, may be configured to request information concerning the changed autonomous driving model from a server device. If a collaborative driving request is received from another purpose-built vehicle via the communication unit, the at least one processor may determine that the driving mode of the purpose-built vehicle has changed. The at least one processor may identify that at least one of the connection type or the driving mode of the purpose-built vehicle has changed and may receive, from a server device, information about one of a first autonomous driving model, a second autonomous driving model, or a third autonomous driving model. The at least one processor may be configured to receive, via the communication unit, data about an autonomous driving model corresponding to the driving mode of the purpose-built vehicle. The loading unit may include a receiving groove and a load sensor, and the second connection signal may include an electrical signal generated when the work module is engaged in the receiving groove or, if the work module is coupled to the loading unit, an electrical signal identified via the load sensor. The at least one processor may determine that the connection type of the work module is the second connection type upon identification of the second connection signal.

The embodiments of the present disclosure provide the effect that a purpose-built vehicle can adaptively operate according to the operating environment of the purpose-built vehicle. Furthermore, the embodiments of the present disclosure provide the effect of improving autonomous driving performance by operating the purpose-built vehicle based on various types of autonomous driving models.

The effects obtainable from the present disclosure are not limited to those mentioned in the various embodiments herein, and other effects not mentioned will be clearly understood by those skilled in the art to which the present disclosure belongs from the following description.

BRIEF DESCRIPTION OF THE DRAWINGS

In relation to the description of the drawings, identical or similar components may use identical or similar reference numerals.

DETAILED DESCRIPTION OF SPECIFIC EMBODIMENTS

Figure 1:
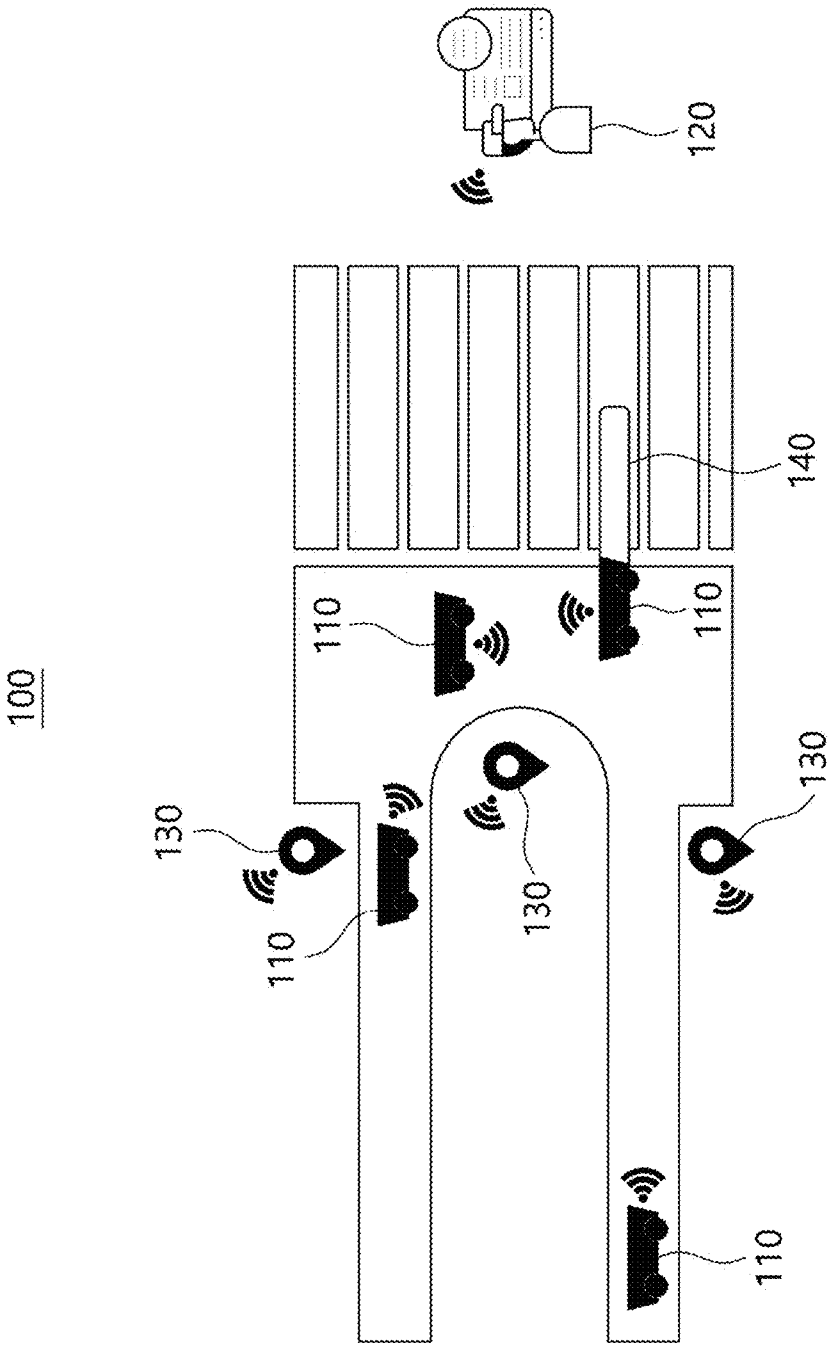
FIG. 1 illustrates an example of a driving environment of a purpose-built vehicle according to one embodiment.

Hereinafter, embodiments of the present disclosure will be described in detail with reference to the drawings so that those skilled in the art to which the present disclosure pertains can easily practice them. However, the present disclosure can be implemented in various different forms and is not limited to the embodiments described here. In describing the drawings, identical or similar components may use identical or similar reference numerals. Also, in the drawings and related descriptions, well-known functions and configurations may be omitted for clarity and brevity.

FIG. 1 illustrates an example of a driving environment of a purpose-built vehicle according to one embodiment.

According to one embodiment, the driving environment 100 of the purpose-built vehicle may include one or more purpose-built vehicles 110, a server device 120, one or more relay devices 130, and a work module 140 connected to the purpose-built vehicle 110.

In some embodiments, the purpose-built vehicle 110 may include a vehicle capable of remote driving based on autonomous driving and a control device (e.g., the server device 120). The purpose-built vehicle 110 can be connected to various types of work modules to perform various functions. The purpose-built vehicle 110 may also be referred to as a "base module."

In some embodiments, although not shown in the figure, the purpose-built vehicle 110 may include at least one receiving unit (e.g., a loading unit, coupling unit, receiving groove, etc.) for connection to the work module.

In some embodiments, the server device 120 may include a control device for controlling the purpose-built vehicle 110. The server device 120 may be referred to as a "control device" or "control server."

In some embodiments, the server device 120 may transmit data required for driving the purpose-built vehicle 110 to the purpose-built vehicle 110. For example, the server device 120 may transmit data related to an autonomous driving model to the purpose-built vehicle 110. For example, the server device 120 may transmit information related to the driving mode (e.g., individual driving mode or collaborative driving mode) of the purpose-built vehicle 110 to the purpose-built vehicle 110. For example, the server device 120 may transmit information about other purpose-built vehicles involved in collaborative driving to the purpose-built vehicle 110. For example, the server device 120 may transmit operational information required for the driving of the purpose-built vehicle 110 to the purpose-built vehicle 110, such as specification information for the purpose-built vehicle 110, specification information for work modules connected to the purpose-built vehicle 110, or information related to the area in which the purpose-built vehicle 110 is operating.

In some embodiments, the server device 120 may receive driving-related data of the purpose-built vehicle 110 from the purpose-built vehicle 110. For example, the server device 120 may receive information regarding the driving data of the purpose-built vehicle 110 (e.g., driving time, driving speed, driving distance, driving path, driving environment, output of the purpose-built vehicle 110) from the purpose-built vehicle 110. For example, the server device 120 may receive data obtained by the purpose-built vehicle 110 from another vehicle (e.g., another purpose-built vehicle in collaborative driving, or another vehicle operating on the road) from the purpose-built vehicle 110.

In some embodiments, based on the driving-related data received from the purpose-built vehicle 110, the server device 120 may train a plurality of autonomous driving models needed for the driving of the purpose-built vehicle 110. The plurality of autonomous driving models may vary depending on the driving environment of the purpose-built vehicle 110 and the type of work module connected, and the server device 120 can train each autonomous driving model.

In some embodiments, although the figure shows only one server device 120, this is merely an example, and one or more server devices may be included in the driving environment 100. The server device 120 may be controlled by an operator, and one server device 120 may control one or more purpose-built vehicles 110.

In some embodiments, although not shown in the figure, the driving environment 100 may include one or more network devices (e.g., base stations) for data communication between the server device 120 and the purpose-built vehicle 110. In a short-range region such as a logistics center, communication between the server device 120 and the purpose-built vehicle 110 can be performed without existing communication infrastructure. However, outside the range of short-range wireless communication (e.g., Wi-Fi, BLE), the purpose-built vehicle 110 and the server device 120 may use a cellular network for communication, so the operating environment may include an external base station (e.g., eNB, gNB).

In some embodiments, the relay device 130 may be a device that identifies information about the driving environment 100 that is difficult to ascertain by only the purpose-built vehicle 110 and the server device 120 and delivers such information to the purpose-built vehicle 110 and the server device 120.

In some embodiments, the relay device 130 can transmit information about the driving environment 100 to the purpose-built vehicle 110 and the server device 120. For example, the relay device 130 may include information about the purpose-built vehicles present in the operating environment, the work modules connected to the purpose-built vehicles (e.g., size information of the work modules, the number of purpose-built vehicles in the driving environment 100, information about vehicles present in a docking station, information regarding drivable areas, and restricted driving areas).

In some embodiments, the work module 140 may include a device connected to the purpose-built vehicle 110 to perform one or more functions.

In some embodiments, the work module 140 can be connected to the purpose-built vehicle 110 based on one or more methods. For example, the work module 140 can be loaded onto the purpose-built vehicle 110 to connect with it. For example, the work module 140 can connect to the purpose-built vehicle 110 via a coupling unit (e.g., a coupler) present in the purpose-built vehicle 110 (e.g., a coupling pin and coupler).

According to various embodiments of the present disclosure, a variety of work modules can be connected to the purpose-built vehicle 110, as will be described in detail with reference to FIG. 2.

Figure 2:
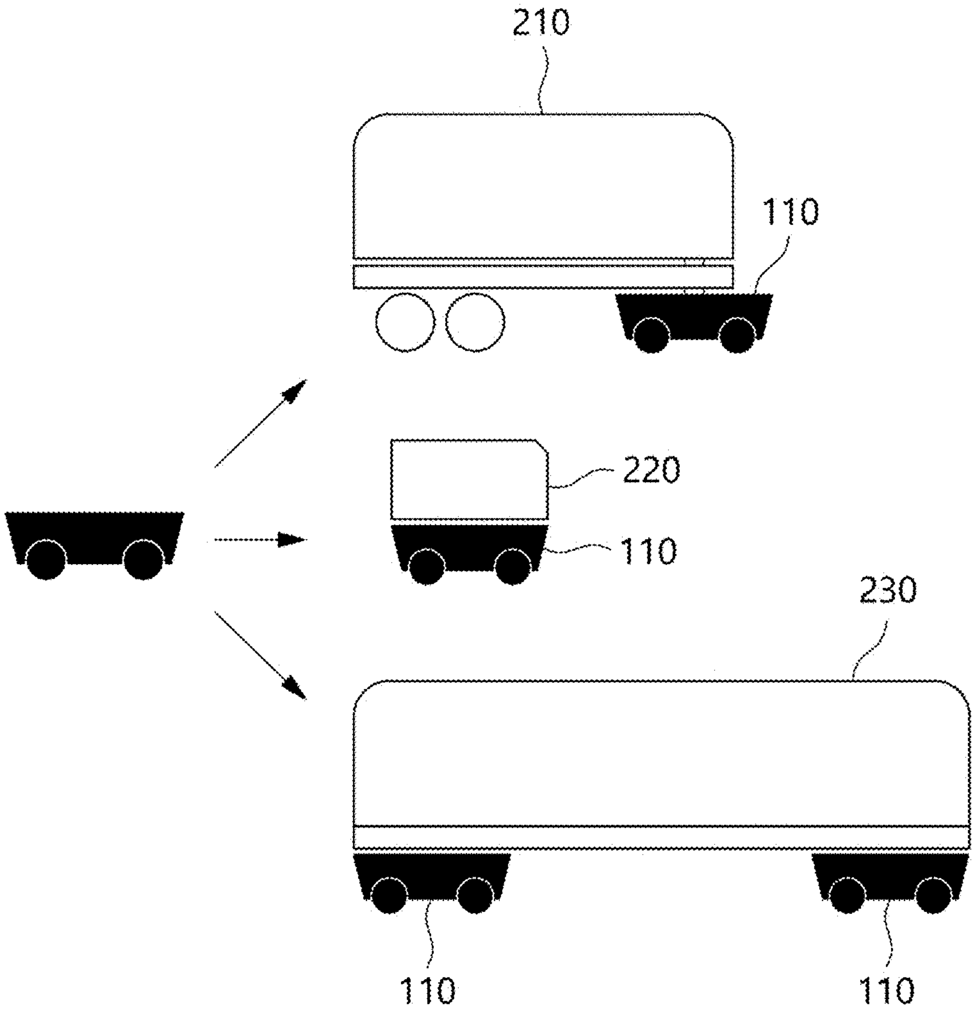
FIG. 2 illustrates an example of a purpose-built vehicle and a work module connectable to the purpose-built vehicle according to one embodiment.

FIG. 2 illustrates an example of a purpose-built vehicle and a work module connectable to the purpose-built vehicle according to one embodiment.

According to one embodiment, the purpose-built vehicle 110 may be connected to various work modules 210. The work modules shown in FIG. 2 are examples, and the various types of work modules that can be connected to the purpose-built vehicle 110 are not limited to those shown in the figure.

In some embodiments, the purpose-built vehicle 110 may be connected to a first work module 210. For example, the first work module 210 may include a trailer for logistics transport.

In some embodiments, the first work module 210 may have a size and structure suitable for stably transporting large cargo (e.g., containers). For example, the first work module 210 may be larger than the standardized container size and may include a coupling unit (e.g., coupling pin) and a drive unit (e.g., wheels) so that it can move when connected to the purpose-built vehicle 110.

In some embodiments, the purpose-built vehicle 110 may be connected to a second work module 220. For example, the second work module 220 may include a work module for parcel transportation.

In some embodiments, the second work module 220 may include a device that has a space for storing items for transport. For example, the second work module 220 may include a space inside for loading items, and that space may be configured to be securely isolated from the outside.

In some embodiments, the purpose-built vehicle 110 may be connected to a third work module 230. For example, the third work module 230 may include a trailer for port transport.

In some embodiments, a plurality of purpose-built vehicles 110 can be connected to the third work module 230. If the third work module 230 has a large size (e.g., length, width, thickness) beyond that of a single purpose-built vehicle 110, it can connect to multiple purpose-built vehicles 110 to perform port transport.

According to one embodiment, the first work module 210 may be connected to the purpose-built vehicle 110 in a manner of being coupled. For example, the first work module 210 can be connected to the purpose-built vehicle 110 by coupling (e.g., coupling pin) the coupling unit (e.g., coupler) formed in the purpose-built vehicle 110 with the first work module 210.

According to one embodiment, the second work module 220 may be connected to the purpose-built vehicle 110 by being loaded onto the vehicle. For example, the second work module 220 can be connected to the purpose-built vehicle 110 by engaging it into a loading unit (e.g., a portion containing a receiving groove) formed in the purpose-built vehicle 110.

According to one embodiment, the third work module 230 can be connected to multiple purpose-built vehicles 110 by coupling. For example, the third work module 230 can be connected to the purpose-built vehicle 110 by coupling multiple coupling units (e.g., couplers) formed in the purpose-built vehicle 110 with multiple coupling units (e.g., coupling pins) of the third work module 230.

In some embodiments, although not shown in the figure, multiple purpose-built vehicles can be coupled to a work module.

The work modules 210, 220, 230 shown in FIG. 2 and how they are connected with the purpose-built vehicle 110 are merely examples, and different types of work modules and connection methods for enabling the functionality of the work modules 210, 220, 230 can be used.

Figure 3:
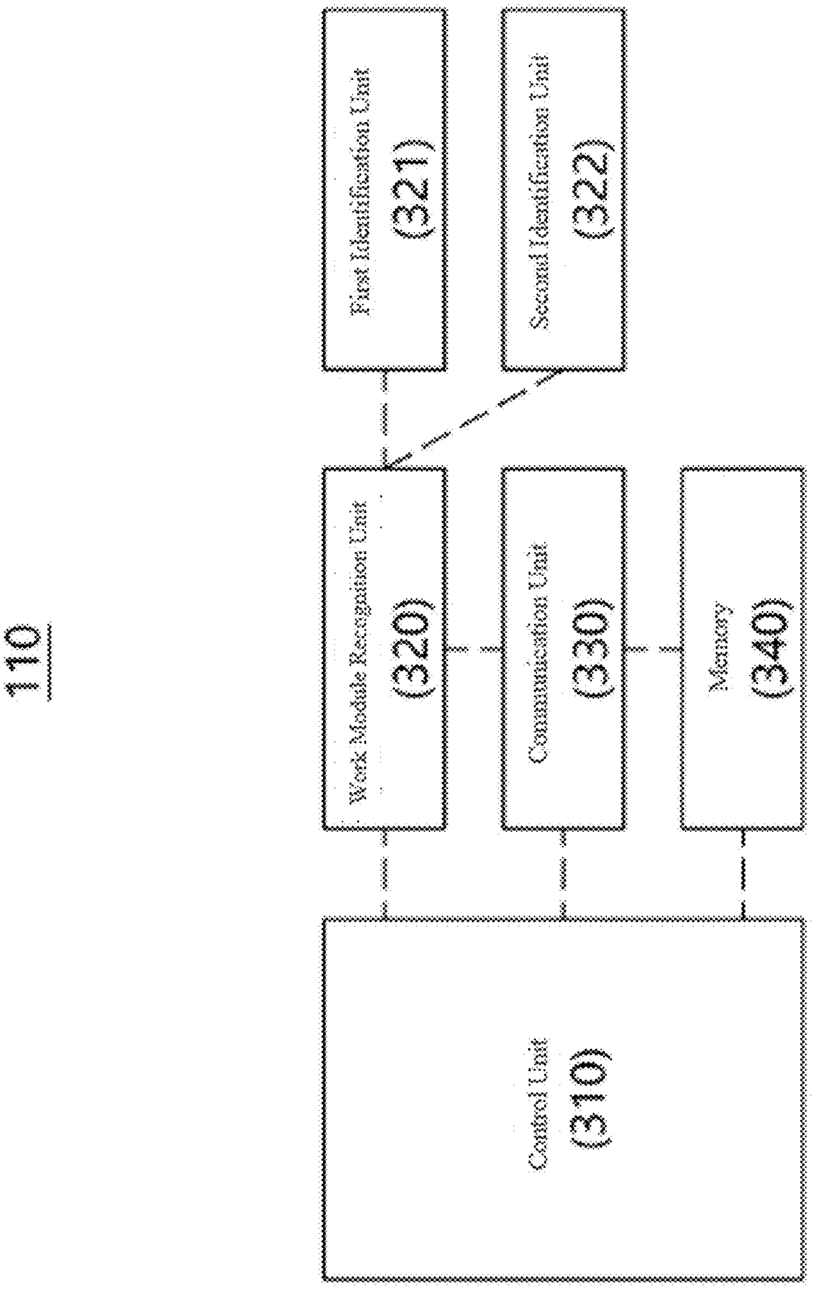
FIG. 3 illustrates a block configuration of a purpose-built vehicle according to one embodiment.

FIG. 3 illustrates a block configuration of a purpose-built vehicle according to one embodiment.

According to one embodiment, the purpose-built vehicle 110 can include a controller 310, a work module recognition unit 320, a first identification unit 321, a second identification unit 322, a communication unit 330, and a memory 340.

According to one embodiment, the work module recognition unit 320 can identify (determine) the type of work module based on the connection signals received from the first identification unit 321 and the second identification unit 322.

In some embodiments, the type of the work module may be one of a first type or a second type. The first type may include work modules connected by being coupled to the purpose-built vehicle. The second type may include work modules connected by being loaded onto the purpose-built vehicle.

In some embodiments, if the work module recognition unit 320 receives a first connection signal, which is an electrical signal from the first identification unit 321, the work module recognition unit 320 may determine that the type of the work module is the first type. If the work module recognition unit 320 receives a second connection signal, which is an electrical signal from the second identification unit 322, the work module recognition unit 320 may determine that the type of the work module is the second type.

In some embodiments, the first identification unit 321 may include a component (e.g., electrical wiring) that can identify that the coupling unit (e.g., coupler) included in the purpose-built vehicle has been coupled to a coupling unit (e.g., coupling pin) of the work module.

In some embodiments, the second identification unit 322 may include a component (e.g., electrical wiring formed in a receiving groove, or a load sensor included in the vehicle) that can identify that the work module has been loaded into the loading unit (e.g., a receiving groove or an upper plate of the vehicle) of the purpose-built vehicle. For example, if an electrical signal is generated when the work module is engaged in the receiving groove, the second identification unit 322 may send a second connection signal to the work module recognition unit 320. For example, if a weight greater than or equal to a predetermined value is identified by the load sensor of the purpose-built vehicle, the second identification unit 322 may detect an electrical signal via the load sensor, and accordingly send the second connection signal to the work module recognition unit 320.

In some embodiments, the work module recognition unit 320 may include a user interface for identifying user input that specifies the type of the work module. Although the purpose-built vehicle 110 itself can directly identify the type of the work module, there may be cases where a user directly inputs the work module. Therefore, if a user input specifying the work module type as the first type or the second type is identified, the work module recognition unit 320 may determine the type of the work module based on that input.

In some embodiments, the work module recognition unit 320 may identify the type of the work module based on a signal that indicates the work module type connected to the purpose-built vehicle, the signal being identified through the communication unit 330. For example, the purpose-built vehicle 110 may receive, via the communication unit, data about the work module connected to the purpose-built vehicle 110 from a server device. In this case, based on the data regarding the work module identified by the communication unit 330, the work module recognition unit 320 may determine the type of the work module.

In the following description, although we use an example in which the work module type is one of the first type or the second type, this is merely illustrative. Various types may exist depending on how the work module and the purpose-built vehicle are connected or how the vehicle is operated. Accordingly, in addition to the first identification unit 321 and the second identification unit 322, various other types of identification units may be present.

According to one embodiment, the memory 340 may be a storage medium used by the purpose-built vehicle 110 that can store data such as at least one command or configuration information corresponding to at least one program. The program may include an operating system (OS) program and various application programs.

In some embodiments, the memory 340 can store data received from an external electronic device (e.g., another purpose-built vehicle) located adjacent to the purpose-built vehicle 110. For example, data received from the external electronic device may include driving information, specification information (e.g., size, weight, output), distance information, etc.

In some embodiments, the memory 340 may include at least one type of storage medium among a flash memory type, hard disk type, multimedia card micro type, card-type memory (e.g., SD or XD memory), RAM (random access memory), SRAM (static random access memory), ROM (read only memory), EEPROM (electrically erasable programmable ROM), PROM (programmable ROM), magnetic memory, magnetic disk, or optical disk.

According to one embodiment, the communication unit 330 may provide a wired or wireless communication interface that enables communication with external devices (e.g., another vehicle, a server device, a relay device, etc.).

In some embodiments, the communication unit 330 may include at least one of a wireless LAN communication unit or a short-range wireless communication unit. The wireless LAN communication unit may, for example, include Wi-Fi and may support IEEE 802.11x, a wireless LAN standard of the IEEE (Institute of Electrical and Electronics Engineers).

In some embodiments, the wireless LAN communication unit may connect wirelessly to an AP (Access Point) under the control of the controller 310. The AP may be a device that enables devices to connect to a computer network using Wi-Fi or related standards. For example, the relay device 130 may perform the function of an AP.

In some embodiments, under the control of the controller 310, the short-range communication unit may wirelessly perform short-range communication with an external device. Examples of short-range communication include Bluetooth, Bluetooth Low Energy (BLE), Infrared Data Association (IrDA), UWB (Ultra WideBand), and NFC (Near Field Communication). The external device may include the server device, another purpose-built vehicle, a relay device, or a user device (e.g., a smartphone, a tablet PC, etc.).

In some embodiments, the purpose-built vehicle 110 may receive via the communication unit 330 various types of data (e.g., data regarding the autonomous driving model) from the server device 120.

In some embodiments, the purpose-built vehicle 110 may transmit via the communication unit 330 various types of data (e.g., driving-related data of the purpose-built vehicle 110) to the server device 120.

According to one embodiment, the controller 310 may execute operations or data processing related to the control and/or communication of at least one other component of the purpose-built vehicle 110 by executing at least one instruction stored in the memory 340.

In some embodiments, the controller 310 may include at least one of a CPU (central processing unit), GPU (graphics processing unit), MCU (microcontroller unit), sensor hub, supplementary processor, communication processor, application processor, ASIC (application-specific integrated circuit), or FPGA (field programmable gate arrays), and may have multiple cores.

In some embodiments, the controller 310 may, for example, run software to control at least one other component (hardware or software) of the purpose-built vehicle 110 that is connected to the controller 310, and perform various data processing or operations.

According to one embodiment, as part of data processing or operations, the controller 310 may store commands or data received from other components in volatile memory, process the commands or data stored in the volatile memory, and store the resulting data in non-volatile memory.

According to one embodiment, the controller 310 may include a main controller (e.g., central processing unit or application processor) or a supplementary controller (e.g., graphics processing unit, neural processing unit (NPU), image signal controller, sensor hub controller, or communication controller) that can operate independently or together with the main controller. For example, if the purpose-built vehicle 110 includes both a main controller and a supplementary controller, the supplementary controller may be configured to use lower power than the main controller or to be specialized for designated functions. The supplementary controller may be implemented as separate from the main controller or as part of it.

In some embodiments, a sensor unit (not shown) may include various types of sensors for detecting objects adjacent to the purpose-built vehicle 110 and identifying the state of the purpose-built vehicle 110. For example, the purpose-built vehicle 110 may include one or more cameras, LiDAR sensors, IMU sensors, load sensors, proximity sensors, etc.

Figure 4:
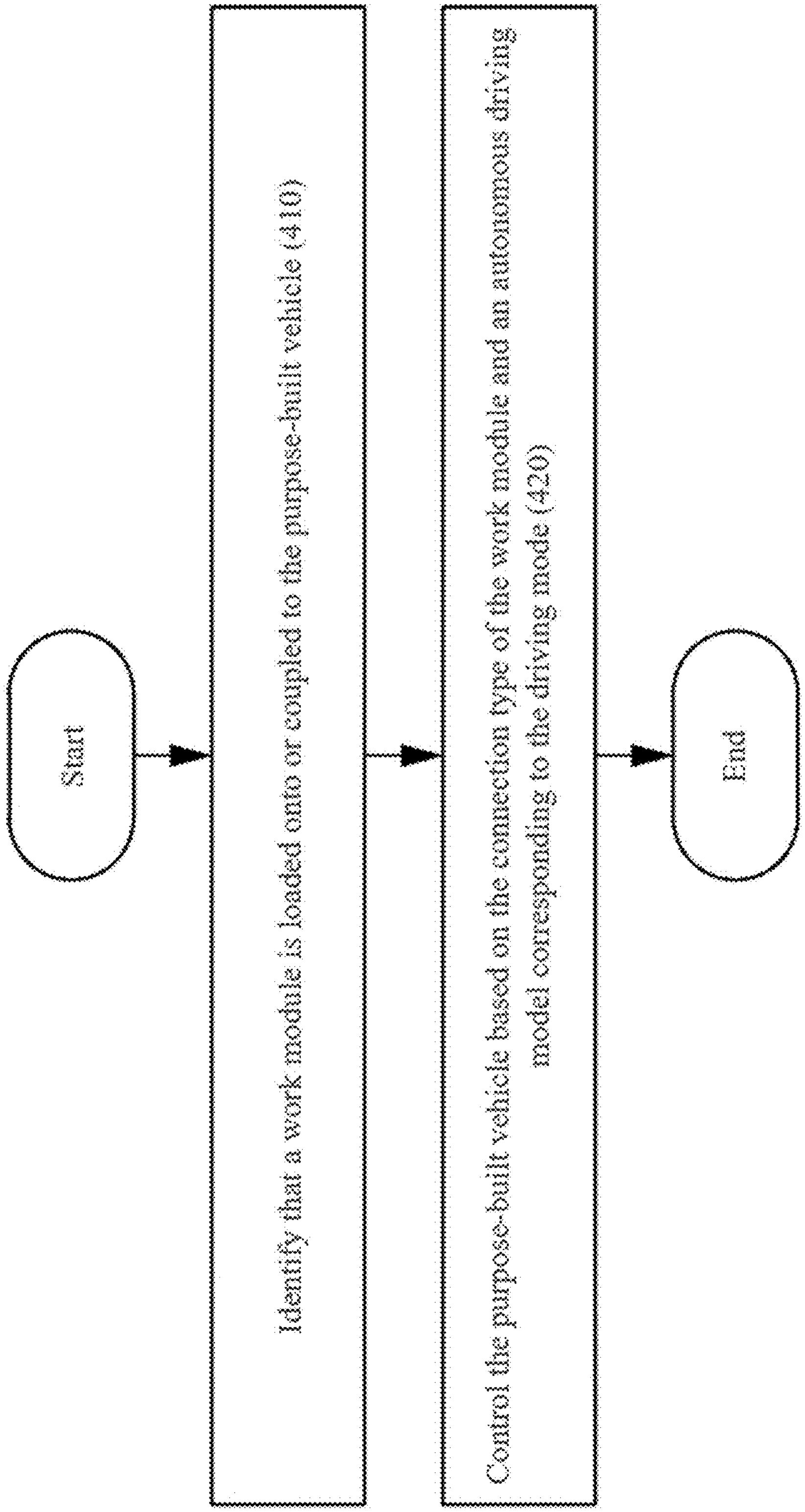
FIG. 4 illustrates an operational flow of a purpose-built vehicle according to one embodiment.

FIG. 4 illustrates an operational flow of a purpose-built vehicle according to one embodiment.

According to one embodiment, in operation 410, the purpose-built vehicle can identify that a work module is loaded onto or coupled to the purpose-built vehicle. The purpose-built vehicle can identify that a work module is connected to the purpose-built vehicle. For example, the purpose-built vehicle can identify that a work module is coupled (e.g., the first work module 210 of FIG. 2) to the purpose-built vehicle. For example, the purpose-built vehicle can identify that a work module is loaded (e.g., the second work module 220, the third work module 230 in FIG. 2) onto the purpose-built vehicle.

In some embodiments, if the purpose-built vehicle receives a signal through either the first identification unit (e.g., the first identification unit 321) or the second identification unit (e.g., the second identification unit 322), the purpose-built vehicle can determine that a work module has been loaded onto or coupled to the purpose-built vehicle.

In some embodiments, the purpose-built vehicle may determine that a work module has been loaded or coupled by using at least one sensor included in the purpose-built vehicle. For example, if a load sensor included in the purpose-built vehicle senses a weight above a certain threshold, the purpose-built vehicle may determine that a work module has been loaded or coupled. For example, based on image data acquired by a camera included in the purpose-built vehicle, the purpose-built vehicle may determine that a work module has been loaded or coupled. For example, if a proximity sensor included in the purpose-built vehicle detects an object of at least a predetermined size in proximity to the purpose-built vehicle, the purpose-built vehicle may determine that a work module has been loaded or coupled.

In some embodiments, the purpose-built vehicle may determine that a work module has been loaded or coupled based on user input identified in the purpose-built vehicle. For example, after a work module is coupled or loaded, the user may input a user command notifying that the work module is coupled or loaded, in which case the purpose-built vehicle may determine that the work module has been loaded or coupled.

According to one embodiment, in operation 420, the purpose-built vehicle can control the purpose-built vehicle based on the connection type of the work module and an autonomous driving model corresponding to the driving mode of the purpose-built vehicle. The connection type of the work module may be one of a first type indicating that the work module is connected in a coupled manner or a second type indicating that the work module is connected in a loaded manner. Controlling the purpose-built vehicle based on the autonomous driving model may refer to the purpose-built vehicle operating from the departure point to the destination based on various types of situations learned by the autonomous driving model.

In some embodiments, the driving mode of the purpose-built vehicle may include a first driving mode indicating individual driving and a second driving mode indicating collaborative driving. The individual driving mode refers to a mode in which the purpose-built vehicle drives individually, meaning that collaboration with other purpose-built vehicles is not required for the operation of the purpose-built vehicle (e.g., the purpose-built vehicle combined with the first work module 210 of FIG. 2 or the purpose-built vehicle combined with the second work module 220). The collaborative driving mode refers to a mode in which the purpose-built vehicle drives together with one or more other purpose-built vehicles, meaning that collaboration with other purpose-built vehicles is required for the operation of the purpose-built vehicle (e.g., the purpose-built vehicle combined with the third work module 230 of FIG. 2). For example, if the purpose-built vehicle operates in the collaborative driving mode, it may exchange data such as the gap, speed, output, and directional settings with other purpose-built vehicles participating in the collaborative driving in real time.

In some embodiments, the autonomous driving model may include a first autonomous driving model, a second autonomous driving model, and a third autonomous driving model.

In some embodiments, the first autonomous driving model may be learned based on: first information that includes specification information (e.g., size, weight, and output) of the purpose-built vehicle; second information that includes specification information (e.g., size of the trailer, friction with the ground, size, weight, and center of gravity of the container loaded on the trailer) of the work module connected to the purpose-built vehicle; first map information for a designated first region in which the purpose-built vehicle autonomously drives; and first autonomous driving control data for autonomous driving in the first region. Based on these, the model outputs first autonomous driving operational data values for the purpose-built vehicle to autonomously drive in the first region.

In some embodiments, the second autonomous driving model may be learned based on: the first information, third information about the size, weight, and center of gravity of the work module, second map information about a designated second region in which the purpose-built vehicle autonomously drives, and second autonomous driving control data for autonomous driving in the second region. Based on these, the model outputs second autonomous driving operational data values for the purpose-built vehicle to autonomously drive in the second region.

In some embodiments, the third autonomous driving model may be learned based on: the first information, fourth information about the distance between the purpose-built vehicle and another purpose-built vehicle, fifth information about containers loaded simultaneously on the purpose-built vehicle and the other purpose-built vehicle, third map information about a designated third region in which the purpose-built vehicle autonomously drives, and third autonomous driving control data for autonomous driving in the third region. Based on these, the model outputs third autonomous driving operational data values for the purpose-built vehicle to autonomously drive in the third region.

In some embodiments, if the work module type is the first type and the driving mode of the purpose-built vehicle is the first driving mode, the purpose-built vehicle can control itself based on the first autonomous driving model.

In some embodiments, if the work module type is the second type and the driving mode of the purpose-built vehicle is the first driving mode, the purpose-built vehicle can control itself based on the second autonomous driving model.

In some embodiments, if the work module type is the second type and the driving mode of the purpose-built vehicle is the second driving mode, the purpose-built vehicle can control itself based on the third autonomous driving model.

Figure 5:
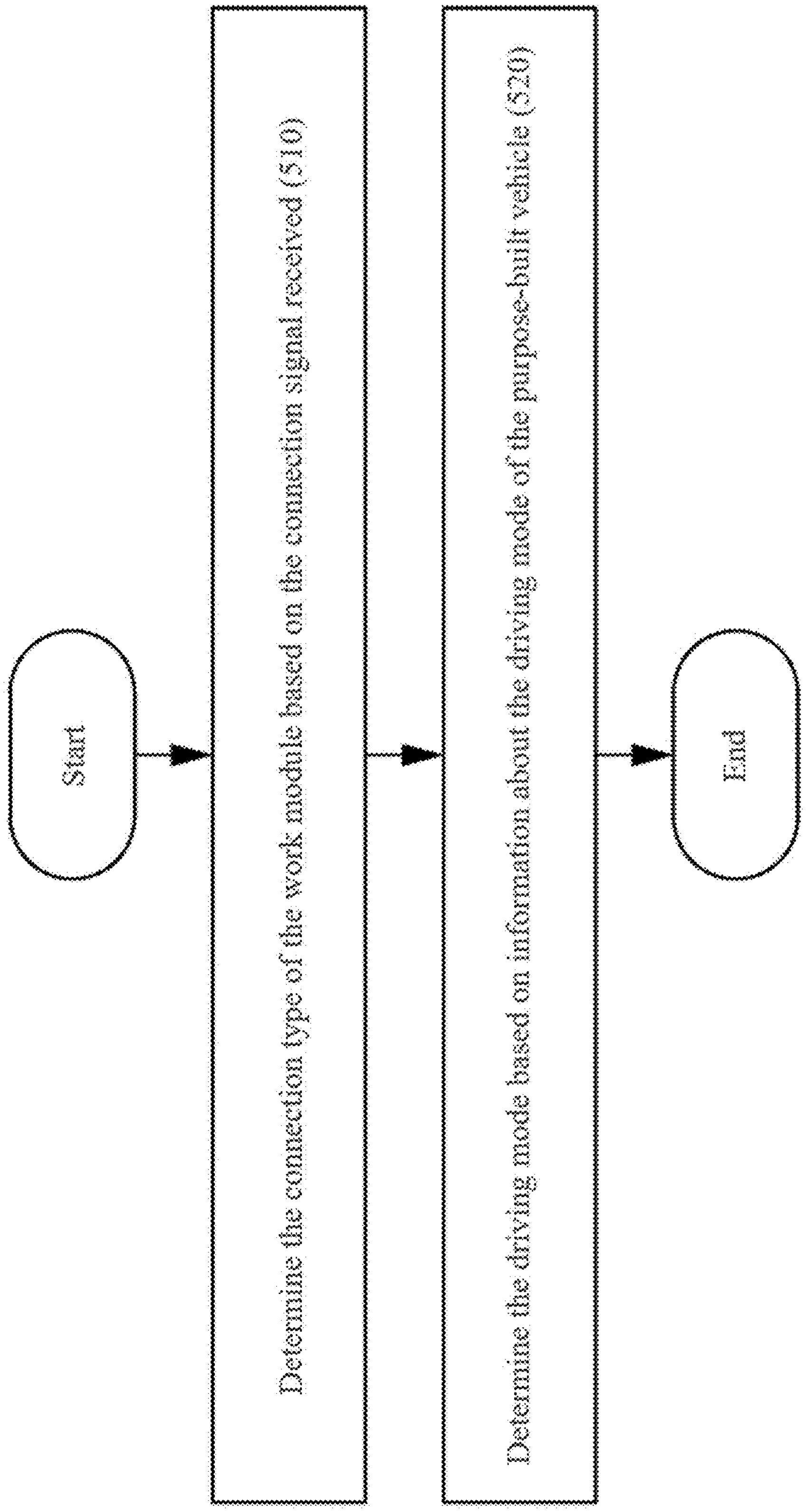
FIG. 5 illustrates an operational flow of a purpose-built vehicle according to one embodiment.

FIG. 5 illustrates an operational flow of a purpose-built vehicle according to one embodiment. The operational flow of the purpose-built vehicle described in FIG. 5 may include detailed operations described in the operational flow of the purpose-built vehicle in FIG. 4.

According to one embodiment, in operation 510, the purpose-built vehicle may determine the connection type of the work module based on the connection signal received. Operation 510 may be an operation performed according to operation 410 in FIG. 4. For example, the purpose-built vehicle may determine the connection type of the work module in response to identifying that a work module has been loaded onto or coupled to the purpose-built vehicle.

In some embodiments, the type of the work module may be either the first type or the second type. The first type may include a work module connected to the purpose-built vehicle in a coupled form. The second type may include a work module connected to the purpose-built vehicle by being loaded onto it.

According to one embodiment, the purpose-built vehicle may identify (determine) the type of the work module based on connection signals received from the first identification unit (e.g., the first identification unit 321) and the second identification unit (e.g., the second identification unit 322).

In some embodiments, if the purpose-built vehicle receives a first connection signal via the first identification unit (e.g., the first identification unit 321), the purpose-built vehicle may decide that the connection type of the work module is the first type.

In some embodiments, if the purpose-built vehicle receives a second connection signal via the second identification unit (e.g., the second identification unit 322), the purpose-built vehicle may decide that the connection type of the work module is the second type.

In some embodiments, the first identification unit may include a component (e.g., electrical wiring) that can identify that the coupling unit (e.g., coupler) of the purpose-built vehicle is connected to a coupling unit (e.g., coupling pin) of the work module.

In some embodiments, the second identification unit may include a component (e.g., electrical wiring formed in the receiving groove, or a load sensor included in the vehicle) that can identify that the work module is loaded onto the loading unit (e.g., a receiving groove or the upper plate of the vehicle) of the purpose-built vehicle. For example, if an electrical signal is detected when the work module is engaged in the receiving groove, the second identification unit can generate a second connection signal. For example, if a weight greater than or equal to a predetermined value is detected by the load sensor of the purpose-built vehicle, the second identification unit can detect an electrical signal via the load sensor and accordingly generate a second connection signal.

In some embodiments, the purpose-built vehicle may include a user interface for identifying user input that specifies the type of the work module. While the purpose-built vehicle itself can identify the work module type, there may also be cases where the user directly enters the work module type. Therefore, if user input specifying the work module type as the first type or second type is identified, the purpose-built vehicle may determine the type of the work module based on that input.

In some embodiments, the purpose-built vehicle may identify the type of the work module based on a signal indicating the type of the work module connected to the purpose-built vehicle, the signal being identified through the communication unit. For example, the purpose-built vehicle may receive data concerning the work module connected to the purpose-built vehicle from the server device via the communication unit. In this case, based on the data about the work module identified by the communication unit, the controller of the purpose-built vehicle may determine the type of the work module.

In the following description, although we use an example in which the type of work module is either the first type or the second type, this is merely illustrative, and various types may exist depending on how the work module and the purpose-built vehicle are connected or operated. Therefore, in addition to the first identification unit and the second identification unit, various other types of identification units may exist.

According to one embodiment, in operation 520, the purpose-built vehicle may determine the driving mode based on information about the driving mode of the purpose-built vehicle.

In some embodiments, the driving mode of the purpose-built vehicle may include a first driving mode indicating individual driving and a second driving mode indicating collaborative driving. The individual driving mode refers to a mode in which the purpose-built vehicle drives independently, meaning that collaboration with another purpose-built vehicle is not required for the operation of the purpose-built vehicle (e.g., the purpose-built vehicle combined with the first work module 210 of FIG. 2 or the purpose-built vehicle combined with the second work module 220). The collaborative driving mode refers to a mode in which the purpose-built vehicle drives together with one or more other purpose-built vehicles, meaning that collaboration with another purpose-built vehicle is required for the operation of the purpose-built vehicle (e.g., the purpose-built vehicle combined with the third work module 230 of FIG. 2). For example, if a purpose-built vehicle is operating in the collaborative driving mode, it may exchange data such as vehicle spacing, speed, output, and direction settings with other purpose-built vehicles participating in the collaborative driving in real time.

Subsequently, the purpose-built vehicle may identify the autonomous driving model corresponding to the work module's connection type determined in operation 510 and the driving mode of the purpose-built vehicle determined in operation 520.

In some embodiments, the autonomous driving model may include a first autonomous driving model, a second autonomous driving model, and a third autonomous driving model.

In some embodiments, the first autonomous driving model may be learned based on: first information that includes specification information (e.g., size, weight, and output) of the purpose-built vehicle; second information that includes specification information (e.g., trailer size, friction with the ground, and the size, weight, and center of gravity of the container loaded on the trailer) for the work module connected to the purpose-built vehicle; first map information for a designated first region in which the vehicle autonomously drives; and first autonomous driving control data for autonomous driving in the first region, so that the model outputs first autonomous driving operational data for autonomous driving in the first region.

In some embodiments, the second autonomous driving model may be learned based on: the first information; third information about the size, weight, and center of gravity of the work module; second map information about a designated second region in which the vehicle autonomously drives; and second autonomous driving control data for autonomous driving in the second region, so that the model outputs second autonomous driving operational data for autonomous driving in the second region.

In some embodiments, the third autonomous driving model may be learned based on: the first information; fourth information about the spacing between the purpose-built vehicle and another purpose-built vehicle; fifth information about containers loaded simultaneously on the purpose-built vehicle and the other purpose-built vehicle; third map information about a designated third region in which the vehicle autonomously drives; and third autonomous driving control data for autonomous driving in the third region, so that the model outputs third autonomous driving operational data for autonomous driving in the third region.

In some embodiments, if the work module type is the first type and the driving mode of the purpose-built vehicle is the first driving mode, the purpose-built vehicle may control itself based on the first autonomous driving model.

In some embodiments, if the work module type is the second type and the driving mode is the first driving mode, the purpose-built vehicle may control itself based on the second autonomous driving model.

In some embodiments, if the work module type is the second type and the driving mode is the second driving mode, the purpose-built vehicle may control itself based on the third autonomous driving model.

Figure 6:
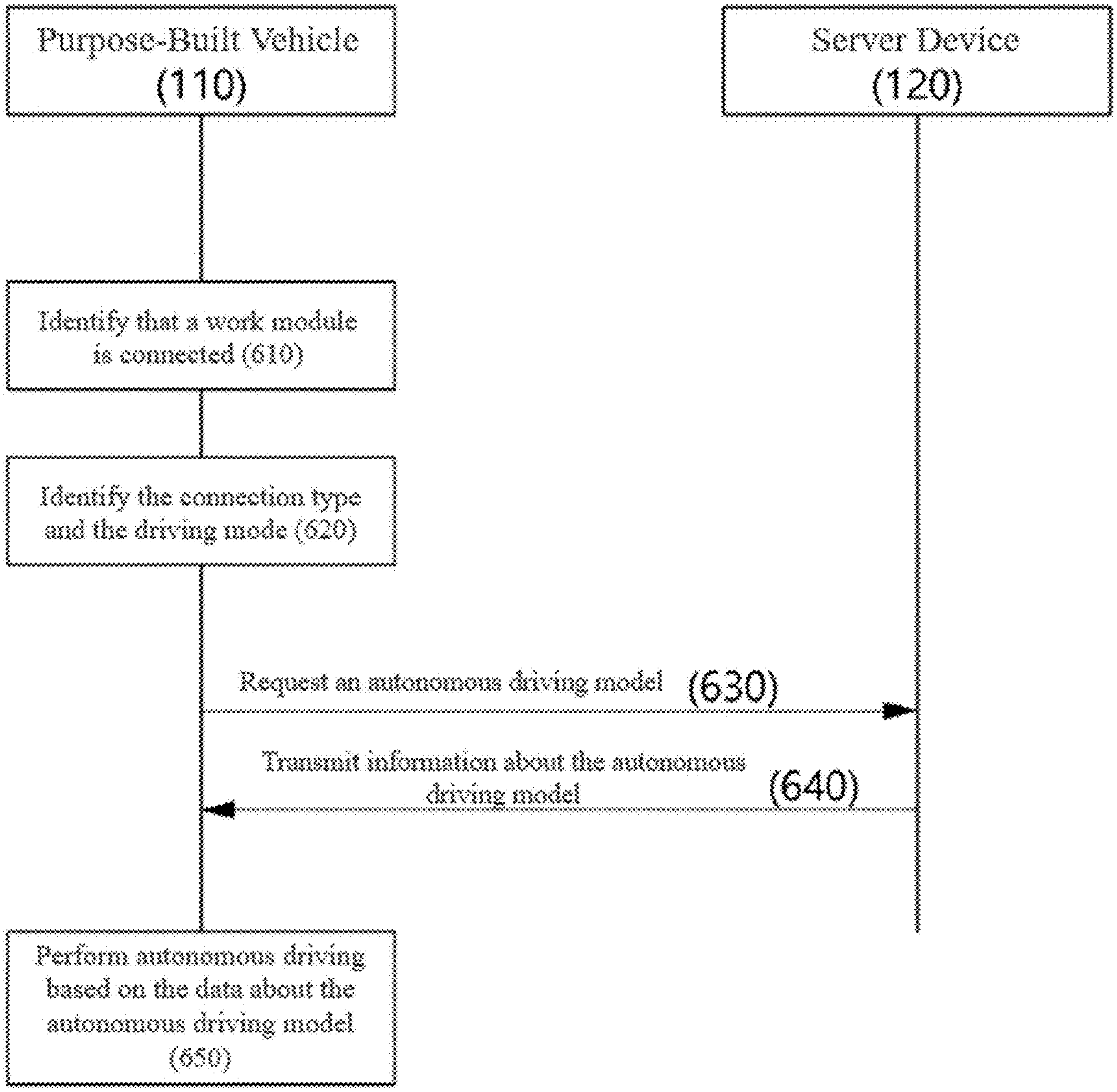
FIG. 6 illustrates a signaling flow between a purpose-built vehicle and a server device according to one embodiment.

FIG. 6 illustrates a signaling flow between a purpose-built vehicle and a server device according to one embodiment. The signaling flow of the purpose-built vehicle and the server device in FIG. 6 may include all the operations described in FIGS. 4 and 5.

According to one embodiment, in operation 610, the purpose-built vehicle 110 may identify that a work module is connected to the purpose-built vehicle 110. Operation 610 may include all the operations described in operation 410 of FIG. 4.

According to one embodiment, in operation 620, the purpose-built vehicle 110 may identify the connection type and the driving mode of the purpose-built vehicle 110. Operation 620 may include all the operations described in operation 510 and operation 520 of FIG. 5.

According to one embodiment, in operation 630, the purpose-built vehicle 110 may request an autonomous driving model from the server device 120.

In some embodiments, the purpose-built vehicle 110 may identify which autonomous driving model corresponds to the connection type of the purpose-built vehicle 110 and the work module and the driving mode of the purpose-built vehicle 110 identified in operation 620. For example, the purpose-built vehicle 110 may select one among the first, second, or third autonomous driving models.

In some embodiments, the purpose-built vehicle 110 may transmit to the server device 120 a signal requesting transmission of information related to the selected autonomous driving model to the purpose-built vehicle 110. Since learning for the autonomous driving model can be continuously performed at the server device 120, the purpose-built vehicle 110 may request the autonomous driving model in operation 630 in order to perform more efficient autonomous driving based on the updated autonomous driving model data.

In some embodiments, the purpose-built vehicle 110 may use short-range wireless communication technology to request the autonomous driving model from the server device 120. For example, if the purpose-built vehicle 110 and the server device 120 are connected to the same Wi-Fi network, the purpose-built vehicle 110 can request the autonomous driving model from the server device 120 using Wi-Fi.

According to one embodiment, in operation 640, the server device 120 can transmit information about the autonomous driving model requested by the purpose-built vehicle 110 to the purpose-built vehicle 110.

In some embodiments, although not shown in the figure, the server device 120 may train the first, second, and third autonomous driving models based on operational data received from the purpose-built vehicle 110 and multiple other purpose-built vehicles.

In some embodiments, the first autonomous driving model may be learned based on: first information including specification information (e.g., size, weight, and output) of the purpose-built vehicle, second information including specification information (e.g., size, friction with the ground, and the size, weight, center of gravity of the container loaded) of the work module connected to the purpose-built vehicle, first map information for a designated first region where the purpose-built vehicle autonomously drives, and first autonomous driving control data to autonomously drive the purpose-built vehicle in the first region, so that the vehicle outputs first autonomous driving operational data values for the first region.

In some embodiments, the second autonomous driving model may be learned based on: the first information, third information about the size, weight, center of gravity of the work module, second map information for a designated second region where the purpose-built vehicle autonomously drives, and second autonomous driving control data to autonomously drive the purpose-built vehicle in the second region, so that the vehicle outputs second autonomous driving operational data values for the second region.

In some embodiments, the third autonomous driving model may be learned based on: the first information, fourth information concerning the distance between the purpose-built vehicle and another purpose-built vehicle, fifth information about containers loaded simultaneously on the purpose-built vehicle and the other purpose-built vehicle, third map information for a designated third region in which the purpose-built vehicle autonomously drives, and third autonomous driving control data for autonomously driving in the third region, so that the vehicle outputs third autonomous driving operational data values for the third region.

According to one embodiment, in operation 650, the purpose-built vehicle 110 may perform autonomous driving based on the data about the autonomous driving model received from the server device 120. Controlling the purpose-built vehicle based on the autonomous driving model may mean that the vehicle travels from the departure point to the destination based on the various types of situations learned by the autonomous driving model.

Figure 7:
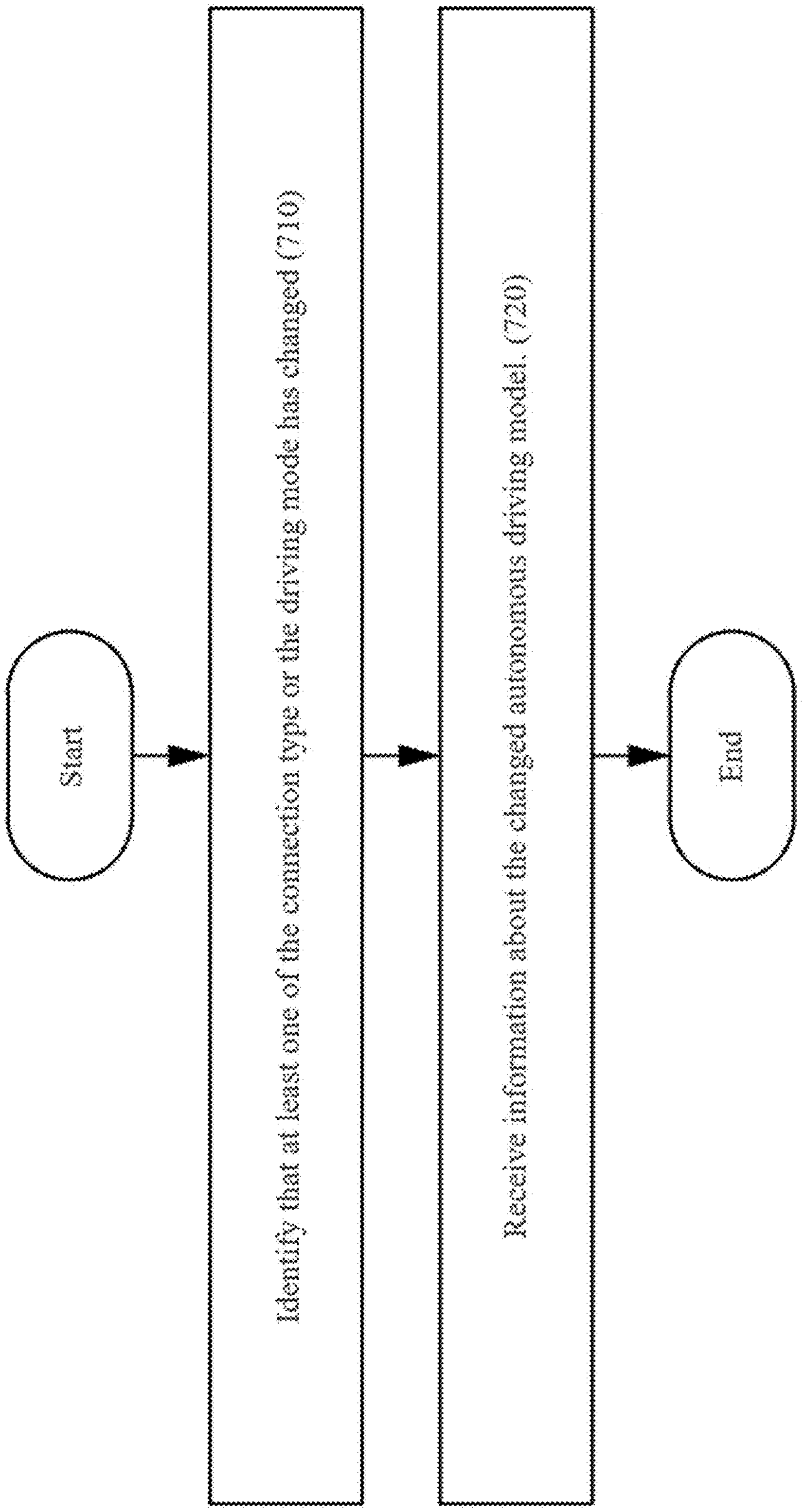
FIG. 7 illustrates an operational flow of a purpose-built vehicle in response to changes in the driving environment according to one embodiment.

FIG. 7 illustrates an operational flow of a purpose-built vehicle in response to changes in the driving environment according to one embodiment. The operations of the purpose-built vehicle described in FIG. 7 concern the operational flow of the purpose-built vehicle when its situation (e.g., the loading or coupling status of the work module, the driving mode) changes while the purpose-built vehicle is performing autonomous driving by selecting an autonomous driving model according to FIGS. 4 through 6.

According to one embodiment, in operation 710, the purpose-built vehicle may identify that at least one of the connection type or the driving mode has changed.

In some embodiments, the purpose-built vehicle may identify that the connection to the currently attached work module has been released. For example, if the load sensor through which a certain weight was being identified detects that the weight has decreased to or below a predetermined value, the purpose-built vehicle may decide that the work module's connection has been released, and thus identify that the connection type has changed.

In some embodiments, the purpose-built vehicle may identify that the connection type of the connected work module has changed (e.g., from the first type to the second type, or from the second type to the first type).

In some embodiments, if the purpose-built vehicle is operating in the individual driving mode and receives a signal from another server device requesting that it perform collaborative driving with at least one other purpose-built vehicle, the purpose-built vehicle may determine that its driving mode will change to the second driving mode. For example, if the purpose-built vehicle receives a collaborative driving request from the server device, it may complete the signaling for collaborative driving with another purpose-built vehicle designated by the server device and switch its driving mode to the second driving mode. For example, if the purpose-built vehicle receives a collaborative driving request from another purpose-built vehicle, it may transmit a signal to the server device asking whether to proceed with collaborative driving, and if it then receives a signal from the server device instructing it to carry out collaborative driving with that other purpose-built vehicle, the purpose-built vehicle may switch to the second driving mode.

In some embodiments, if the purpose-built vehicle is operating in the collaborative driving mode and receives a signal from another server device requesting it to perform individual driving with another purpose-built vehicle currently in collaborative driving, the purpose-built vehicle may decide to switch the driving mode to the first driving mode. For example, if the purpose-built vehicle receives an individual driving request from the server device, it may complete the signaling needed to release collaborative driving with the other purpose-built vehicle designated by the server device and switch its driving mode to the first driving mode. For example, if the purpose-built vehicle receives an individual driving request from another purpose-built vehicle, it may transmit a signal to the server device asking whether to release collaborative driving, and if it receives a signal from the server device instructing it to conduct individual driving with the other purpose-built vehicle, the purpose-built vehicle may switch its driving mode to the first driving mode.

According to one embodiment, in operation 720, the purpose-built vehicle may receive information about the changed autonomous driving model.

In some embodiments, because the connection type or driving mode has changed, the purpose-built vehicle may transmit a signal to the server device requesting it to send the autonomous driving model corresponding to the changed connection type and the changed driving mode. The server device may transmit data regarding the changed autonomous driving model to the purpose-built vehicle, and the purpose-built vehicle may perform autonomous driving based on the received autonomous driving model.

Figure 8:
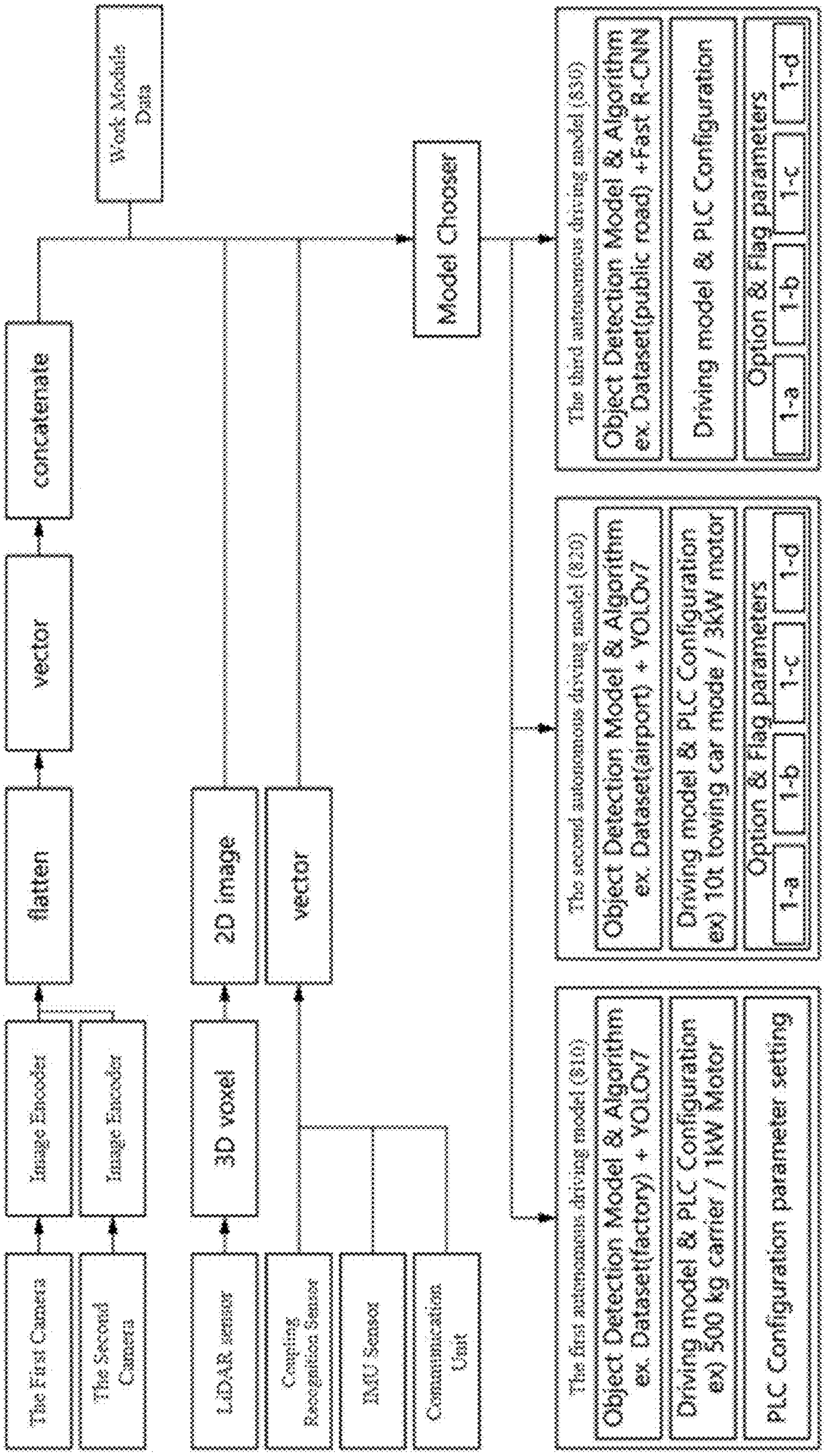
FIG. 8 illustrates an example of an autonomous driving model for a purpose-built vehicle according to one embodiment.

FIG. 8 illustrates an example of an autonomous driving model of a purpose-built vehicle according to one embodiment.

Referring to FIG. 8, the autonomous driving model can be selected based on data acquired via various kinds of sensors (e.g., camera, LiDAR sensor, coupling recognition sensor, IMU sensor) included in the purpose-built vehicle (e.g., camera—image, LiDAR sensor—distance and shape of the surrounding environment, IMU sensor—position, direction, and speed of surrounding moving objects, coupling recognition sensor (work module recognition unit)—type of the work module), information about the operating environment and driving mode of the purpose-built vehicle obtained through the communication unit, and work module data (e.g., size, weight, specification information of the work module).

In some embodiments, the purpose-built vehicle can continuously perform learning for autonomous driving based on the various algorithms included in the selected autonomous driving model, and the learned autonomous driving model, generated as a result, can be transmitted to the purpose-built vehicle so that the purpose-built vehicle can enable remote driving.

According to one embodiment of the present disclosure, a purpose-built vehicle (PBV) includes: a work module identification unit to identify that at least one work module is loaded onto or coupled to the purpose-built vehicle, a communication unit for data communication, and at least one processor connected to the work module identification unit and the communication unit. The at least one processor identifies that a work module is loaded onto or coupled to the purpose-built vehicle, identifies the connection type of the work module via the work module identification unit, and based on the connection type of the work module and the driving mode of the purpose-built vehicle, controls the purpose-built vehicle. The connection type of the work module may be one of a first connection type, indicating a type connected through the coupling unit of the purpose-built vehicle, and a second connection type, indicating a type loaded through the loading unit of the purpose-built vehicle; the driving mode of the purpose-built vehicle may include a first driving mode indicating individual driving and a second driving mode indicating collaborative driving.

In some embodiments, the work module identification unit includes a first identification unit connected to the coupling unit of the purpose-built vehicle and a second identification unit connected to the loading unit of the purpose-built vehicle, and the at least one processor, if a first connection signal is identified via the first identification unit, determines the connection type of the work module as the first connection type, and if a second connection signal is identified via the second identification unit, determines the connection type of the work module as the second connection type.

In some embodiments, the coupling unit includes a coupler, the loading unit includes a receiving groove and a load sensor, the first connection signal includes an electrical signal generated when the coupler and the coupling pin of the work module are connected, and the second connection signal includes an electrical signal generated when the work module is engaged in the receiving groove or, if the work module is coupled to the loading unit, an electrical signal identified via the load sensor.

In some embodiments, the at least one processor is configured to receive, via the communication unit, data about an autonomous driving model corresponding to the driving mode of the purpose-built vehicle.

In some embodiments, the autonomous driving model may include: a first autonomous driving model learned for autonomous driving when the work module is coupled to the purpose-built vehicle via the coupling unit, a second autonomous driving model learned for autonomous driving when the work module is loaded onto the purpose-built vehicle via the loading unit and the vehicle is in the first driving mode, and a third autonomous driving model learned for autonomous driving when the work module is loaded onto the purpose-built vehicle via the loading unit and the vehicle is in the second driving mode.

In some embodiments, the at least one processor receives, from the server device via the communication unit, information concerning the driving mode of the purpose-built vehicle, and determines the driving mode of the purpose-built vehicle based on the received information about the driving mode.

In some embodiments, the at least one processor identifies that at least one of the connection type or driving mode of the purpose-built vehicle has changed, and is configured to receive, from the server device, information about one of the first autonomous driving model, the second autonomous driving model, or the third autonomous driving model.

In some embodiments, the at least one processor, in response to identifying that at least one of the connection type or the driving mode of the purpose-built vehicle has changed, is configured to request information about the changed autonomous driving model from the server device.

In some embodiments, the at least one processor, if a collaborative driving request is received from another purpose-built vehicle via the communication unit, is configured to determine that the driving mode of the purpose-built vehicle has changed.

In some embodiments, the at least one processor, if it identifies via the first identification unit or the second identification unit that the work module has changed, is configured to determine that the connection type of the purpose-built vehicle has changed.

According to one embodiment of the present disclosure, a method of operating a purpose-built vehicle (PBV) includes: identifying that a work module is loaded onto or coupled to the purpose-built vehicle; identifying the connection type of the work module; and controlling the purpose-built vehicle based on the connection type of the work module and an autonomous driving model corresponding to the driving mode of the purpose-built vehicle. The connection type of the work module may include one of a first connection type, indicating a type connected via the coupling unit of the purpose-built vehicle, and a second connection type, indicating a type loaded via the loading unit of the purpose-built vehicle; and the driving mode of the purpose-built vehicle may include a first driving mode indicating individual driving and a second driving mode indicating collaborative driving.

In some embodiments, if a first connection signal is identified via a first identification unit connected to the coupling unit of the purpose-built vehicle, the connection type of the work module is determined to be the first connection type; and if a second connection signal is identified via a second identification unit connected to the loading unit of the purpose-built vehicle, the connection type of the work module is determined to be the second connection type.

In some embodiments, the first connection signal includes an electrical signal generated when the coupler of the purpose-built vehicle and the coupling pin of the work module are connected, and the second connection signal includes an electrical signal generated when the work module is engaged in the receiving groove of the purpose-built vehicle or, if the work module is coupled to the loading unit, an electrical signal identified via the load sensor.

In some embodiments, the method of operating the purpose-built vehicle includes receiving data regarding an autonomous driving model corresponding to the driving mode of the purpose-built vehicle.

In some embodiments, the autonomous driving model may include: a first autonomous driving model learned to perform autonomous driving when the work module is coupled to the purpose-built vehicle via the coupling unit; a second autonomous driving model learned to perform autonomous driving when the work module is loaded onto the purpose-built vehicle via the loading unit and the vehicle is in the first driving mode; and a third autonomous driving model learned to perform autonomous driving when the work module is loaded onto the purpose-built vehicle via the loading unit and the vehicle is in the second driving mode.

In the various embodiments disclosed in this disclosure, the electronic device can take a variety of forms. For example, the electronic device may include a display device, a portable communication device (e.g., a smartphone), a computer device, a portable multimedia device, a portable medical device, a camera, a wearable device, or a home appliance. The electronic device according to the embodiments of this disclosure is not limited to the aforementioned devices.

The various embodiments in this disclosure and the terms used therein should not be interpreted as restricting the technical features disclosed in this disclosure to certain embodiments only. Rather, it should be understood that these embodiments encompass various modifications, equivalents, or alternatives. For example, if a component is expressed in the singular, it should be understood as including multiple components unless the context clearly indicates that it is solely in the singular form. The term "and/or" as used in this disclosure should be understood to encompass all possible combinations of one or more of the enumerated items. The terms "comprise," "have," "include," and "constitute," as used in this disclosure, merely specify that the described features, components, parts, or combinations thereof exist, and do not exclude the possibility that one or more other features, components, parts, or combinations thereof may also exist or be added. In this disclosure, phrases such as "A or B," "at least one of A and B," "at least one of A or B," "A, B, or C," "at least one of A, B, and C," and "at least one of A, B, or C" each may include any one, or all possible combinations, of the items enumerated in the respective phrases. Terms such as "first," "second," "primary," or "secondary" are merely used to distinguish one component from other components having similar attributes and do not limit those components in other respects (e.g., importance or order).

In the various embodiments of this disclosure, the terms "~unit" or "~module" may include units implemented in hardware, software, or firmware, and may be used interchangeably with terms such as logic, logical block, component, or circuit. The "~unit" or "~module" may be an integrated component as a whole, or it may be the minimum unit (or a portion thereof) of the component that performs one or more functions. For example, according to one embodiment, a "~unit" or "~module" may be implemented in the form of an ASIC (application-specific integrated circuit).

In various embodiments of this disclosure, the phrase "in the event that ~" may, depending on the context, be interpreted as "when ~," "at the time of ~," "in response to determining ~," or "in response to detecting ~." Similarly, "in the event it is determined ~" or "in the event ~ is detected" may, depending on the context, be interpreted as "upon determination" or "in response to determining," or "upon detection" or "in response to detecting."

A program executed by the server device 200 described in this disclosure can be implemented by a combination of hardware components, software components, and/or both hardware and software components. The program can be executed by any system capable of executing computer-readable instructions.

Software may include one or more of a computer program, code, instruction(s), or any combination thereof, which configure (independently or collectively) a processing device to operate in a desired manner or command the processing device to do so. Software can be implemented as a computer program that includes instructions stored in a computer-readable storage medium. Examples of computer-readable storage media include magnetic storage media (e.g., ROM (Read-Only Memory), RAM (Random-Access Memory), floppy disks, hard disks) and optical reading media (e.g., CD-ROM (Compact Disc-Read Only Memory), DVD (Digital Versatile Disc)), among others. A computer-readable storage medium can be distributed across computer systems connected by a network, and in a distributed manner, computer-readable code can be stored and executed. A computer program may be distributed (e.g., downloaded or uploaded) online, either via an application store (e.g., Play Store™) or directly between two user devices (e.g., smartphones). In the case of online distribution, at least part of the computer program product may be stored at least temporarily or created temporarily in a computer-readable storage medium, such as the memory of the manufacturer's server, the application store's server, or an intermediary server.

According to various embodiments, each component (e.g., module or program) among the aforementioned components may include a single entity or multiple entities, and some among multiple entities may be disposed separately in other components. According to various embodiments, one or more of the aforementioned components or operations thereof may be omitted, or one or more other components or operations may be added. Alternatively or additionally, multiple components (e.g., modules or programs) can be integrated into a single component. In such a case, the integrated component may perform one or more of the functions of each of the plurality of components, in the same or similar manner as performed by the respective component(s) before integration. According to various embodiments, operations performed by a module, a program, or another component may be executed sequentially, in parallel, repeatedly, or heuristically. One or more of these operations may be executed in a different order, omitted, or one or more other operations may be added.

What is claimed is:

1. A purpose-built vehicle (PBV) device, comprising:

a work module identification unit for identifying that at least one work module is loaded or coupled to the purpose-built vehicle;

a communication unit for transmitting and receiving data; and at least one processor connected to the work module identification unit and the communication unit;

wherein the at least one processor:

identifies that a work module is loaded or coupled to the purpose-built vehicle;

identifies a connection type of the work module through the work module identification unit; and is configured to control the purpose-built vehicle based on an autonomous driving model corresponding to the connection type of the work module and a driving mode of the purpose-built vehicle, wherein the connection type of the work module includes one among a first connection type indicating a type connected through a coupling unit of the purpose-built vehicle and a second connection type indicating a type loaded through a loading unit of the purpose-built vehicle, wherein the driving mode of the purpose-built vehicle includes a first driving mode indicating an individual driving mode and a second driving mode indicating a collaborative driving mode, and wherein the autonomous driving model comprises:

a first autonomous driving model learned so that the purpose-built vehicle autonomously drives while the work module is coupled to the purpose-built vehicle through the coupling unit;

a second autonomous driving model learned so that the purpose-built vehicle autonomously drives while the work module is loaded on the purpose-built vehicle through the loading unit in the first driving mode; and a third autonomous driving model learned so that the purpose-built vehicle autonomously drives while the work module is loaded on the purpose-built vehicle through the loading unit in the second driving mode.

2. The device of claim 1, wherein:

the work module identification unit comprises:

a first identification unit connected to the coupling unit of the purpose-built vehicle;

a second identification unit connected to the loading unit of the purpose-built vehicle; and the at least one processor is configured to:

determine the connection type of the work module as the first connection type when a first connection signal is identified through the first identification unit;

and determine the connection type of the work module as the second connection type when a second connection signal is identified through the second identification unit.

3. The device of claim 2, wherein:

the coupling unit comprises a coupler;

the loading unit comprises a receiving groove and a load sensor;

the first connection signal comprises an electrical signal that occurs when the coupler and a coupling pin of the work module are connected; and the second connection signal comprises an electrical signal that occurs when the work module is coupled to the receiving groove or an electrical signal identified through the load sensor when the work module is coupled to the loading unit.

4. The device of claim 2, wherein the at least one processor:

is configured to receive information about the driving mode of the purpose-built vehicle from a server device through the communication unit; and is configured to determine the driving mode of the purpose-built vehicle based on the received information about the driving mode of the purpose-built vehicle.

5. The device of claim 2, wherein the at least one processor:

identifies that at least one of the connection type or the driving mode of the purpose-built vehicle has changed; and is configured to receive information about one of the first autonomous driving model, the second autonomous driving model, or the third autonomous driving model from a server device.

6. The device of claim 5, wherein the at least one processor is configured to request information about the changed autonomous driving model from the server device in response to identifying that at least one of the connection type or the driving mode of the purpose-built vehicle has changed.

7. The device of claim 5, wherein the at least one processor is configured to determine that the driving mode of the purpose-built vehicle has changed when a request for collaborative driving is received from another purpose-built vehicle through the communication unit.

8. The device of claim 5, wherein the at least one processor is configured to determine that the connection type of the purpose-built vehicle has changed when the first identification unit or the second identification unit identifies that the work module has changed.

9. The device of claim 1, wherein the at least one processor is configured to receive data about an autonomous driving model corresponding to the driving mode of the purpose-built vehicle through the communication unit.

10. A method of operating a purpose-built vehicle (PBV), comprising:

identifying that a work module is loaded or coupled to the purpose-built vehicle;

identifying a connection type of the work module; and controlling the purpose-built vehicle based on an autonomous driving model corresponding to the connection type of the work module and a driving mode of the purpose-built vehicle;

wherein the connection type of the work module includes one among a first connection type indicating a type connected through a coupling unit of the purpose-built vehicle and a second connection type indicating a type loaded through a loading unit of the purpose-built vehicle, wherein the driving mode of the purpose-built vehicle includes a first driving mode indicating an individual driving mode and a second driving mode indicating a collaborative driving mode, and wherein the autonomous driving model comprises:

a first autonomous driving model learned so that the purpose-built vehicle autonomously drives while the work module is coupled to the purpose-built vehicle through the coupling unit;

a second autonomous driving model learned so that the purpose-built vehicle autonomously drives while the work module is loaded on the purpose-built vehicle through the loading unit in the first driving mode; and a third autonomous driving model learned so that the purpose-built vehicle autonomously drives while the work module is loaded on the purpose-built vehicle through the loading unit in the second driving mode.

11. The method of claim 10, wherein when a first connection signal is identified through a first identification unit connected to the coupling unit of the purpose-built vehicle, the connection type of the work module is determined to be the first connection type, and when a second connection signal is identified through a second identification unit connected to the loading unit of the purpose-built vehicle, the connection type of the work module is determined to be the second connection type.

12. The method of claim 11, wherein the first connection signal comprises an electrical signal that occurs when a coupler of the purpose-built vehicle and a coupling pin of the work module are connected, and the second connection signal comprises an electrical signal that occurs when the work module is coupled to a receiving groove of the purpose-built vehicle or an electrical signal identified through a load sensor when the work module is coupled to the loading unit.

13. The method of claim 10, wherein the method includes an operation of receiving data about the autonomous driving model corresponding to the driving mode of the purpose-built vehicle.

14. A purpose-built vehicle (PBV) device, comprising:

a work module identification unit to identify that at least one work module is loaded onto or coupled to the purpose-built vehicle, a communication unit for data communication, and at least one processor connected to the work module identification unit and the communication unit, wherein the at least one processor:

identifies that a work module has been loaded onto or coupled to the purpose-built vehicle, identifies, via the work module identification unit, the connection type of the work module, and, based on an autonomous driving model corresponding to the connection type of the work module and the driving mode of the purpose-built vehicle, controls the purpose-built vehicle, wherein the connection type of the work module includes one among a first connection type, indicating a type connected via a coupling unit of the purpose-built vehicle, and a second connection type, indicating a type loaded via the loading unit of the purpose-built vehicle, wherein the driving mode of the purpose-built vehicle includes a first driving mode indicating individual driving and a second driving mode indicating collaborative driving, wherein the autonomous driving model comprises:

a first autonomous driving model learned so that the purpose-built vehicle autonomously drives while the work module is coupled to the purpose-built vehicle through the coupling unit;

a second autonomous driving model learned so that the purpose-built vehicle autonomously drives while the work module is loaded on the purpose-built vehicle through the loading unit in the first driving mode; and a third autonomous driving model learned so that the purpose-built vehicle autonomously drives while the work module is loaded on the purpose-built vehicle through the loading unit in the second driving mode, and wherein the at least one processor, upon identifying that at least one of the connection type or the driving mode of the purpose-built vehicle has changed, is configured to request information concerning the changed autonomous driving model from a server device.

15. The device of claim 14, wherein when a collaborative driving request is received from another purpose-built vehicle via the communication unit, the at least one processor is configured to determine that the driving mode of the purpose-built vehicle has changed.

16. The device of claim 14, wherein the at least one processor identifies that at least one of the connection type or the driving mode of the purpose-built vehicle has changed, and receives, from the server device, information about one of the first autonomous driving model, the second autonomous driving model, or the third autonomous driving model.

17. The device of claim 14, wherein the at least one processor is configured to receive, via the communication unit, data about an autonomous driving model corresponding to the driving mode of the purpose-built vehicle.

18. The device of claim 14, wherein the loading unit includes a receiving groove and a load sensor, and the second connection signal includes an electrical signal generated when the work module is engaged in the receiving groove or, when the work module is coupled to the loading unit, an electrical signal identified via the load sensor, and wherein the at least one processor determines that the connection type of the work module is the second connection type upon identification of the second connection signal.

* * * * *